(12) United States Patent
Jiang (10) Patent No.: US 10,165,894 B2
(45) Date of Patent: Jan. 1, 2019

(54) AUTOMATED COOKER

(71) Applicant: Peigen Jiang, Sammamish, WA (US)

(72) Inventor: Peigen Jiang, Sammamish, WA (US)

( * ) Notice: Subject to any disclaimer, the term of this patent is extended or adjusted under 35 U.S.C. 154(b) by 418 days.

(21) Appl. No.: 15/206,281

(22) Filed: Jul. 10, 2016

(65) Prior Publication Data

US 2018/0008089 A1   Jan. 11, 2018

(51) Int. Cl.
*A47J 27/62* (2006.01)
*A47J 36/16* (2006.01)
*A47J 36/06* (2006.01)
*H05B 6/06* (2006.01)

(52) U.S. Cl.
CPC ............. *A47J 36/165* (2013.01); *A47J 36/06* (2013.01); *H05B 6/062* (2013.01)

(58) Field of Classification Search
CPC ........ A47J 36/06; A47J 36/165; A47J 36/004; A47J 36/10; H05B 6/062; H05B 6/1227
USPC ........ 366/241–251, 281–286, 308, 276–278; 99/331, 348
See application file for complete search history.

(56) References Cited

U.S. PATENT DOCUMENTS

| | | | | |
|---|---|---|---|---|
| 5,687,642 A | * | 11/1997 | Chao ..................... | H05B 6/1227 219/624 |
| 6,264,358 B1 | * | 7/2001 | Eisaman .................. | B01F 11/04 366/197 |
| 7,022,956 B2 | * | 4/2006 | Greenstreet .......... | H05B 6/6411 219/726 |
| 9,138,103 B1 | * | 9/2015 | Cados ................... | B01F 7/0095 |
| 2014/0345475 A1 | * | 11/2014 | Trench Roca .......... | A47J 27/62 99/325 |
| 2016/0256007 A1 | * | 9/2016 | Dickson, Jr. ........ | A47J 43/0722 |

FOREIGN PATENT DOCUMENTS

CN            203828739      *   9/2014

* cited by examiner

*Primary Examiner* — Dana Ross
*Assistant Examiner* — Joseph Iskra (57) ABSTRACT

A cooking system is disclosed which includes a wok for receiving food, the wok being placed on top of a base unit housing a heating element for heating up the wok, a lid substantially covering the wok, at least a portion of the lid being able to rotate relative to the wok, a shaft secured to the rotating portion of the lid, a stirrer pivotally mounted to the shaft, a controller housed in the base unit controlling the heating element and rotations of the shaft and the lid, the rotation of the shaft causing a part of the stirrer to sweep from an edge of the wok to approximately a center of the wok in a low path and return to an edge of the wok in a high path, in the low path the part of the stirrer approximately touching a surface of the wok, in the high path the part of the stirrer being high above and not touching the surface of the wok, and a computing device residing outside of the base unit and signally coupled to the controller, the computing device storing a computer program upon execution instructing the computing device to send operating commands to the controller, the operating commands controlling the heating element and the rotations of the shaft and the lid.

20 Claims, 8 Drawing Sheets

AUTOMATED COOKER

CROSS-REFERENCE TO RELATED APPLICATIONS

This application is a continuation-in-part of prior U.S. patent application Ser. No. 15/081,947, filed Mar. 28, 2016, titled "AUTOMATED COOKER", the contents of which is hereby incorporated in its entirety by reference.

BACKGROUND

The present invention relates generally to cooking apparatus, and, more particularly, to an automated cooking system and method.

Home meal cooking has traditionally been a manual operation, i.e., cooking time, temperature and occasional stirring of food in a cooking utensil are determined and implemented by a human operator. Such traditional way of cooking is not only labor intensive, but also heavily rely on operators' experience to make a good meal.

Even though cooking recipes have been widely available, they mostly emphasize on ingredients and not much on the art of actual heating the food.

As such, what is desired is a system and method that can automate much of the cooking process and provide a platform for people to share such automated cooking process.

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein.

DESCRIPTION

The present invention relates to an automated cooking system and method. A preferred embodiment of the present invention will be described hereinafter with reference to the attached drawings.

Figure 1:
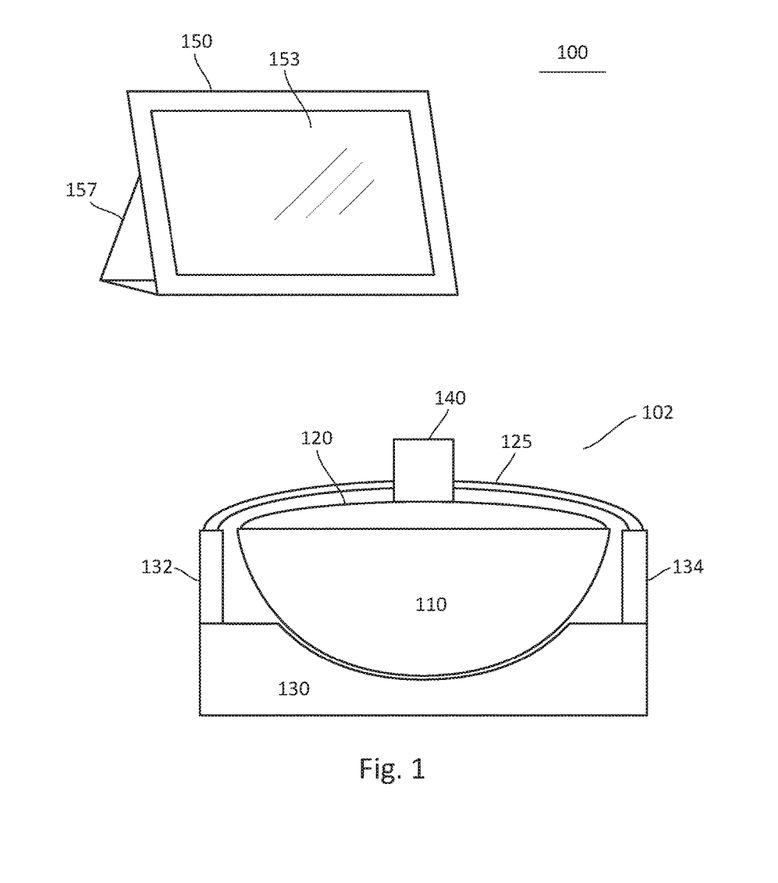
FIG. 1 illustrates an automated cooking system according to an embodiment of the present invention.

FIG. 1 illustrates an automated cooking system 100 according to an embodiment of the present invention. The automated cooking system 100 includes an automated cooker 102 and a tablet computer 150. The tablet computer 150 wirelessly communicates with the automated cooker 102 to function as a remote controller and monitor as well as a cooking process programming device. The tablet computer 150 is of a common type having a touch display 153 and a stand 157. In other embodiments, a laptop or a desktop or even a dedicated computing device with at least a processing unit and a storage can be used in place of the tablet computer 150

Referring again to FIG. 1, the automated cooker 102 includes a wok 110 with a lid 120, a base unit 130 and a stirrer actuator 140 mounted on the lid 120. In a preferred embodiment, the base unit 130 uses inductive effect to generate heat in the wok 110. In addition, a bar 125 is attached to the stirrer actuator 140. One end of the bar 125 rests on a left riser 132, and the other end of the bar 125 rests on a right riser 134. The left riser 132 and the right riser 134 exemplarily protrude from the base unit 130. Alternatively, the ends of the bar 125 can be extended downward to reach the base unit without any protruding member from the base unit 130. In embodiments, power supply and control unit are housed in the base unit 130. In order to supply power and conduct control signals to the stirrer actuator 140, electrical contacts (not shown) are provided on an end of the bar 125 and on top of one of the risers 132 and 134, so that when the bar 125 rests on the risers 132 and 134, electrical connections are made between the two parts. Then the bar 125 serves as a conduit to hide electrical wires connecting the stirrer actuator to the base unit 130.

Referring again to FIG. 1, the bar 125 is separated from the lid 120 to avoid being heat up during cooking. However, when the bar 125 is made with a heat resistive material such aluminum, the bar 125 can come into contact with or even be part of the lid 120.

Figure 2A:
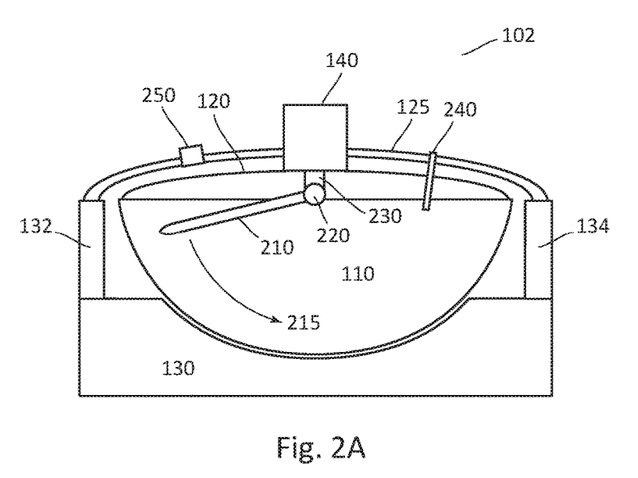
FIGS. 2A and 2B illustrate details of an automated cooker shown in FIG. 1.
Figure 2B:
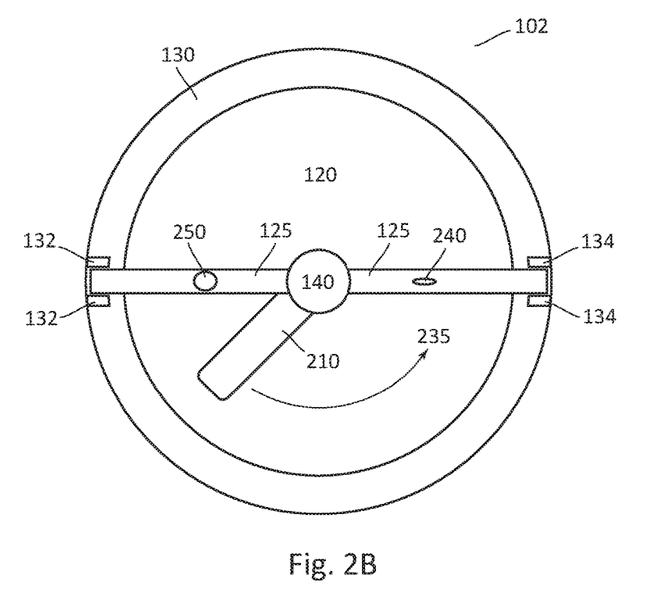

FIGS. 2A and 2B illustrates details of the automated cooker 102 shown in FIG. 1. Referring to FIG. 2A, the automated cooker 102 further includes a stirrer 210 coupled to the stirrer actuator 140 which drives the stirrer 210 to make swing motion around a horizontal shaft 220 which is coupled to the stirrer actuator 140 through a vertical shaft 230. Referring to both FIGS. 2A and 2B, the stirrer 210, along with the horizontal shaft 220 and the vertical shaft 230, are driven by the stirrer actuator 140 to rotate around the stationary stirrer actuator 140. The stirrer 210's swing and rotating motion can stir food (not shown) inside the wok 110 during cooking. The swing and rotating speeds can be adjusted based on characteristics of the food under cooking. For the same reason, the stirrer 210 is replaceable. For thicker food, the stirrer 210 may have a thinner blade; while for lighter food, such as leafy vegetables, the stirrer 210 may have a wider blade. In addition, the blade of the stirrer 210 may form an oblique angle (not shown), which is adjustable, to the plane in which the stirrer 210 swings.

Referring again to FIGS. 2A and 2B, a temperature sensor 240 is mounted on the bar 125 with a probe reaching into the wok 110. Ambient temperature data is then relayed to a controller inside the base unit 130 via wires hidden inside the bar 125 and the riser 132 or 134. Similarly, an image sensor 250 can also be mounted on the bar 125 for periodically taking images of the content in the wok 110. The images are also transmitted to the controller inside the base unit 130. In embodiments, a smell sensor (not shown) may also been installed. The smell sensor may detect a burn and immediately shut off the automated cooking system.

Referring again to FIG. 2B, risers 132 and 134 prevent the bar 125 from rotating relative to the base unit 130, so that the lid 120 and the stirrer actuator 140 remain stationary when the stirrer 210 swings and rotates. Such feature is further depicted in FIG. 3.

Figure 3:
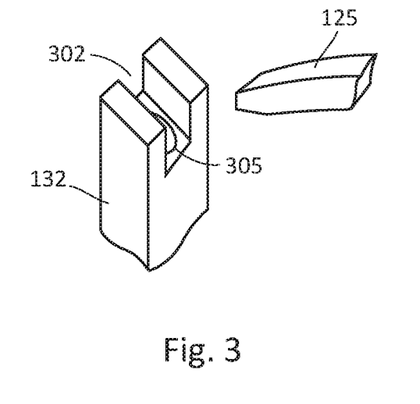
FIG. 3 illustrates an exemplary fixture for restraining the lid of the automated cooker shown in FIG. 2.

FIG. 3 illustrates an exemplary fixture for restraining the lid 120 of the automated cooker 102 shown in FIG. 2. The fixture includes a notch 302 formed on top of the riser 120. When an end of the bar 125 falls into the notch 302, movement of the bar 125 will be restricted. Similarly, the riser 134 also has such a notch (not shown) for restricting the other end of the bar 125.

Referring again to FIG. 3, an exemplary conductive terminal 305 is provided at a bottom of the notch 302. There is a corresponding conductive terminal (not shown) on a bottom surface of the bar 125, so that when the bar 125 is placed in the notch 302, the conductive terminals come into contact to make a connection between a wire in the riser 132 and a wire in the bar 125 for conducting electricity or control signal. In other embodiments, multiple conductive terminals, if needed, can be provided at the bottom or on a side of the notch 302.

Figure 4:
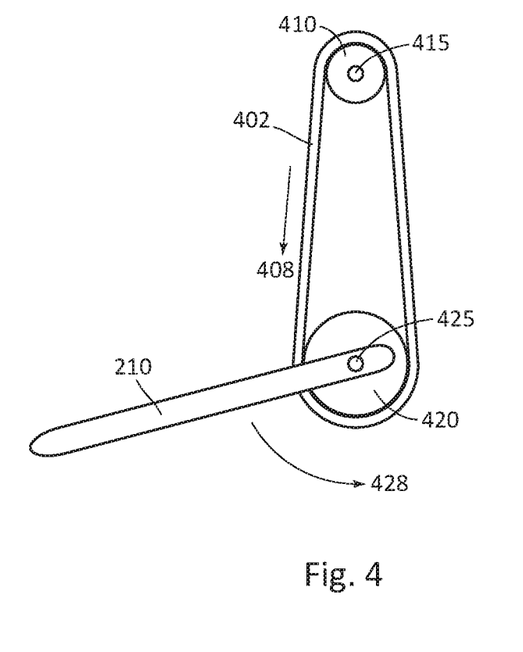
FIG. 4 illustrates a stirrer driving mechanism.

FIG. 4 illustrates a stirrer driving mechanism. The stirrer 210 is attached to a first pulley 420, which can rotate around a first axis 425. Above the first pulley 420, there is a second pulley 410 driven by an electrical motor (not shown) to rotate around a second axis 415. The first and second pulleys 420 and 410 are linked by a belt 402. When the second pulley 410 rotates counter clockwise, the belt 402 will move in a direction 408 and cause the first pulley 420 to also rotate counter clockwise. As a result, the stirrer 210 will swing in direction 428. In a next cycle, the stirrer 210 swings in a direction opposite to the direction 428. As the first pulley 420 and the belt 402 are located below the lid 120, they have to be made with heat resistive materials. In embodiments, the first pulley 420 may be made from stainless steel, and the belt 402 may be made from Polytetrafluoroethylene (PTFE) or commonly known as Teflon. As the second pulley 410 is located above the lid 120, it along with the electrical motor will not be exposed to excessive heat, so that they can be made with ordinary materials. In order to better engage the pulleys 410 and 420 with the belt 402, corresponding teeth may be provided to surfaces of the pulleys 410 and 420 and the belt 402.

Referring to both FIGS. 2 and 4, the first axis 425 may be equivalent to the horizontal shaft 220. The belt 402 may be housed in the vertical shaft 230 to which the first axis 425 and the second axis 415 are secured. A motor and gear system (not shown) which is mounted to a shell of the stirrer actuator 140 can drive the vertical shaft 230 to rotate in a horizontal plane.

Figure 5:
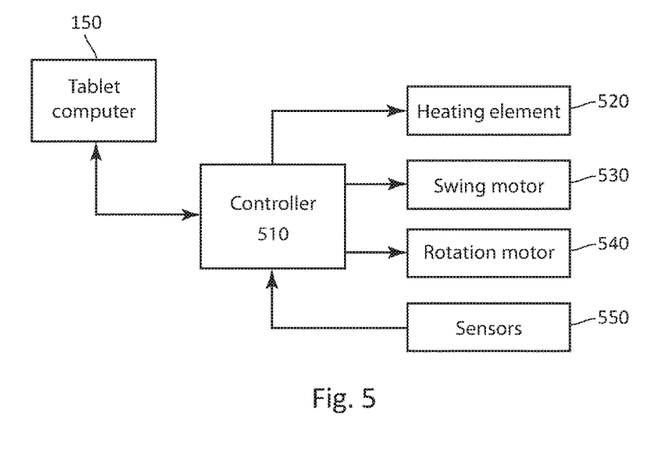
FIG. 5 is a block diagram illustrating electronic components of automated cooking system shown in FIG. 1.

FIG. 5 is a block diagram illustrating electronic components of automated cooking system 100 shown in FIG. 1. The automated cooking system 100 includes the tablet computer 150 and a controller 510 which controls a heating element 520, a swing motor 520 and a rotation motor 530. The heating element 520 is housed in the base unit 130 and may be of inductive type. The swing motor 520 drives the swing motion of the stirrer 210. The rotation motor 530 drives the horizontal rotating motion of the stirrer 210. In addition, one or more sensors 550 can be connected to the controller 510. Sensors 550 may include temperature sensing, image capturing, smell detection and weight measurement. The controller 510 is then coupled to the tablet computer 150 either wirelessly or wired, and receives commands from and transmits sensed data to the tablet computer 150.

In operation, the tablet computer 150 may store one or more cooking recipes in a form of an executable computer program with unique sets of variables. Upon executing the computer program, the variables determine various cooking parameters such as temperature target, heating timing and duration, and speeds and timing of stirrer's swing and rotation, etc. Upon an initiation of a recipe, the tablet computer 150 sends commands to the controller 510 to turn on the heating element 520 as well as turns on the swing motor 530 and rotation motor 540 after a predetermined period of time following the turn-on of the heating element 520. In the beginning, speeds of the stirrer swing and rotation may be slow and gradually increase over time. The controller 510 may also activate the sensors 550 to periodically sample the ambient data such as temperature. Once a predetermined cooking time is reached, the tablet computer 150 sends a command to the controller 510 to turn off everything and at the same time produces a reminder, such as sound, to signal the completion of the cooking. Alternatively, the tablet computer 150 may command the controller 510 to reduce heat and turn off the swing motor 530 and the rotation motor 540. In such a way, the automated cooking system 100 can keep the food warm after the cooking. During the keeping-warm period, the tablet computer 150 keeps measuring the temperature and controllably operates the heating element 520 to maintain a desired temperature. The tablet computer 150 may also control a weight sensor (not shown) situated beneath the wok 110 to monitor the weight of the wok 110. Once the weight is below a predetermined level signaling an empty wok 110, the heating element 520 will be automatically turned off accordingly.

Figure 6:
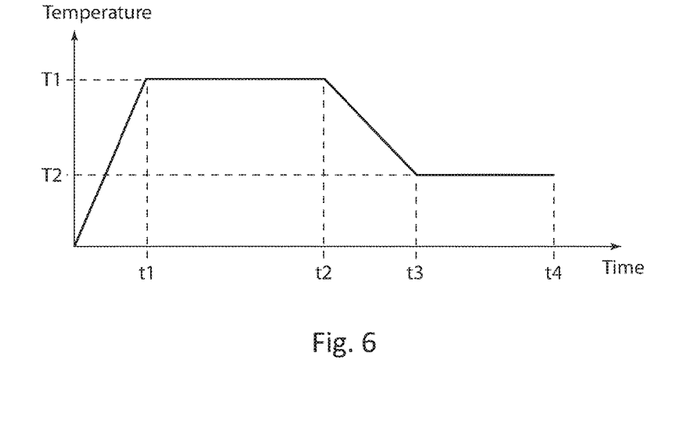
FIG. 6 illustrates an exemplary temperature profile of a recipe displayed on the tablet computer.

FIG. 6 illustrates an exemplary temperature profile of a recipe that is displayed on the tablet computer 150. At time t1, the measured temperature is controlled to reach temperature T1, which is maintained until time t2. At time t3, temperature value is allowed to drop to T2 which is then maintained until t4. As FIG. 6 illustrates, the automated cooking system 100 can finely adjust a cooking process in terms of temperature, duration and stirring with the control of the tablet computer 150. Similarly, stirring speed and timing parameters can also be displayed on the tablet computer 150.

Figure 7:
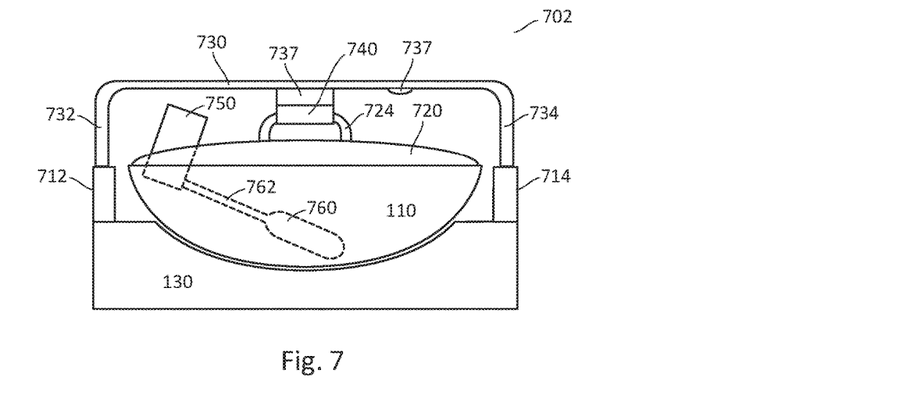
FIG. 7 illustrates another automated cooker according to an embodiment of the present invention.

FIG. 7 illustrates another automated cooker 702 according to an embodiment of the present invention. The automated cooker 702 mounts a stirrer actuator 750 on an edge of a lid 720. The stirrer actuator 750 is connected to a stirrer 760 through a rod 762. The stirrer actuator 750 drives the stirrer 760 to repeatedly sweep through a center region of the wok 110. At a beginning of a sweeping cycle, the stirrer 760 starts from an edge of the wok 110 and sweeps toward the center and across a bottom of the wok 110. Then the stirrer 760 returns from the center to the edge of the wok 110 in a raised position and gets ready to start another sweeping cycle.

Referring again to FIG. 7, a handle 724 is mounted to a center of the lid 720. The handle 724 as shown in FIG. 7 is engaged to a rotating block 740 which is driven by a rotating driver 737. The rotating driver 737 is mounted on a bar 730 that is engaged to the base unit 130 through a pair of riser 712 and 714 from the base unit 130. There are electrical contacts at the interface between the bar 730 and the risers 712 and 714, as well as between the rotating block 740 and the handle 724 (not shown), so that power and electrical signals can be conducted between the base unit 130 and the rotating driver 740 and the stirrer actuator 750. When engaged, the bar 730 is stationary relative to the base unit, the base unit 130 controllably supplies power to the rotating block 740 to drive the lid 720 to rotate, so that the stirrer 760 evenly stirs entire regions of the wok 110. In order to make the rotation easier, rim of the lid 720 may be made of a smooth plastic material, such as Teflon, and rim of the wok 110 may be made of smooth and long-lasting stainless steel. In other embodiments, the handle 724 includes a magnetic material, and the rotating block 740 may be electromagnetic. During a rotation, the electromagnetic rotating block 740 is magnetized to slightly lift the lid 720 to reduce friction between the lid 720 and the wok 110. In addition, an image sensor 737, such as those used in video cameras, is mounted on the bar 730 facing the wok 110, and an illuminating light source (not shown), such as a light emitting diode (LED) light bulb, may be installed underneath the lid 720. In this case, at least the portion of the lid 720 that is under the image sensor 737 is made of glass, so that the image sensor 737 can see through the lid 720. During a cooking operation, the LED light bulb may light up and the image sensor 737 takes video to be shown on the tablet computer 150, so that a user can observe the cooking process without opening the lid. As the tablet computer 150 is equipped with manual control buttons, the user can instruct the automated cooker 702 to perform operations from the tablet computer 150. In an embodiment, the aforementioned video and manual control buttons are transmitted and re-imaged on a remote computing device, such as a smartphone, so that a remote user can monitor and exercise controls over the cooking process on the smartphone just as he or she would do on the tablet computer 150. The remote computing device is connected to the tablet computer 150 through Wi-Fi or the Internet or both. One scenario can be that after a user starts a cooking process, he or she does not have to stay in the kitchen and can go to an office and still be able to monitor and control the cooking process on a smartphone.

Figure 8:
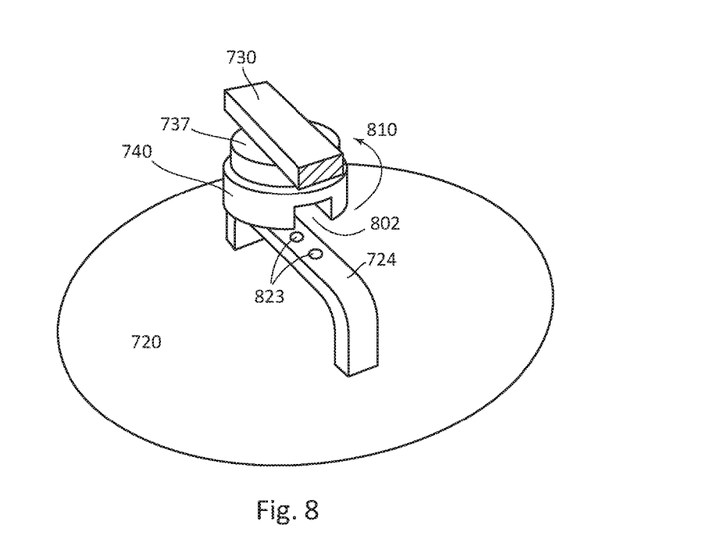
FIG. 8 illustrates engagement details of the lid handle and rotating block.

FIG. 8 illustrates engagement details of the handle 724 and rotating block 740. In an embodiment, the rotating block 740 has a notch 802 to fittingly receive the handle 724. When the rotating block 740 is driven by the rotating driver 737 to rotate in the direction 810, the handle 724 and hence the lid 720 will rotate as well. The rotating driver 737 is fixed on the bar 730. When the bar 730 is lifted, the lid 720 is then free to be removed from the wok 110 by grabbing onto the handle 724 and lifting it. As shown in FIG. 8, there are electrical contacts 823 built into the handle 724 and there are electrical wires leading from the contacts 823 to the stirrer actuator 750 as well as various sensors mounted on the lid 720 (not shown). There are also electrical contacts (not shown) built into the notch 802 of the rotating block 740. When the notch 802 fits onto the handle 724, the electrical contacts 823 conduct power and signals to and from the lid 720.

Figure 9:
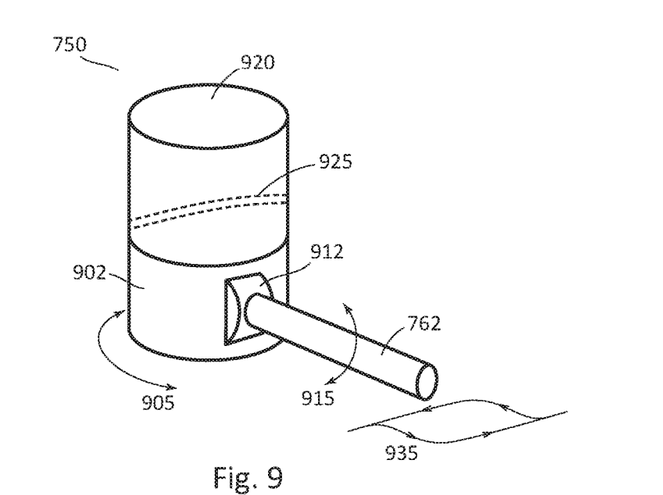
FIG. 9 illustrates a stirrer actuator according to an embodiment of the present invention.

FIG. 9 illustrates a stirrer actuator 750 according to an embodiment of the present invention. The stirrer actuator 750 has a rotating part 902 and a stationary part 920. The stationary part 920 is mounted to the lid 720 (not shown) at location 925. The rotating part 902 rotates back and forth horizontally in a direction 905. The rotating part 902 holds the rod 762 which can swing up and down vertically in a direction 915. In embodiments, a combination of rotation in the direction 905 and a swing in the direction 915 creates a quadrilateral movement path 935 for the stirrer 760. In the downward half of the movement path 935, the stirrer 760 stays low and sweeps from an edge to a center of the wok 110. As a result, the stirrer 760 is in touch with shell of the wok 110 during this movement, so that food is swept up and shoveled toward the center of the wok 110. In the upward half of the movement path 935, the stirrer 760 stays high and swings from the center back to the edge the wok 110 with less disturbance to the food. When the stirrer 760 is at the edge of the wok 110, the lid 720 along with the stirrer 760 then rotate to a new location to start another cycle of sweeping. Such movements mimic the way a human operator may operate the wok 110. In embodiments, speeds of the stirrer 760's sweep and the lid 720's rotation have predetermined default values and are allowed to be set to other values by a user. The quadrilateral movement path 935 is generally preset based on a shape of the wok 110. In embodiments, the upward half of the movement path 935 is allowed to be modified by a user.

Figure 10A:
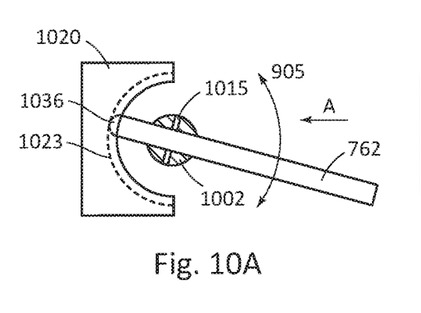
FIGS. 10A and 10B illustrate an exemplary structure for realizing a quadrilateral movement path for the stirrer.
Figure 10B:
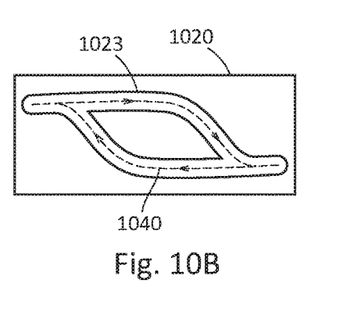

FIGS. 10A and 10B illustrate an exemplary internal structure of the rotating part 902 for realizing the quadrilateral movement path 935 for the stirrer 760. FIG. 10A is top view of the structure which includes a vertical shaft 1002, a horizontal shaft 1015 and a motion restrictive block 1020. The horizontal shaft 1015 is driven by the stationary part 920 (not shown) to provide the horizontal rotation 905. The horizontal shaft 1015 secures the stirrer rod 762 to the vertical shaft 1002 while allows the stirrer rod 762 to rotate around the horizontal shaft 1015. The motion restrictive block 1020 is stationary relative to the stationary part 920 (not shown), and have a concave track 1023 to receive an end 1036 of the stirrer rod 762. The concave track 1023 is circular when viewed from top and shares the same origin as the vertical shaft 1002, so that when the vertical shaft 1002 rotates, the end 1036 always stays in the concave track 1023. If the concave track 1023 changes height vertically along the track, when the vertical shaft 1002 rotates, the end 1036 will move vertically which in turn will force the stirrer rod 762 to rotate vertically around the horizontal shaft 1015.

FIG. 10B illustrates a side view of an exemplary concave track 1023 from an A direction shown in FIG. 10A. The concave track 1023 has a quadrilateral path 1040, so that when the vertical shaft 1002 rotates back and forth in direction 905, the end 1036 follows the quadrilateral path 1040 and produce the quadrilateral movement 935 of the stirrer 760 (see FIG. 9).

Figure 11:
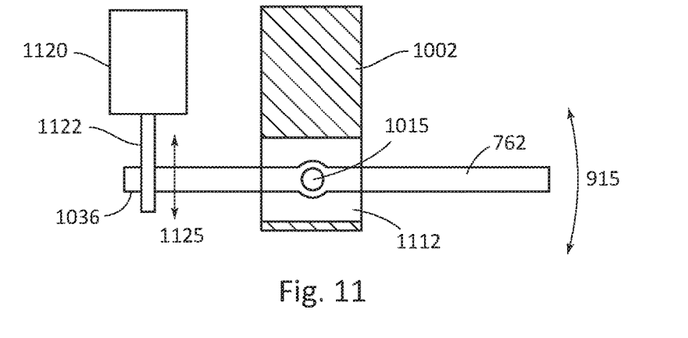
FIG. 11 illustrates another exemplary structure for realizing a quadrilateral movement path for the stirrer.

FIG. 11 illustrates another exemplary internal structure of the rotating part 902 for realizing the quadrilateral movement path 935 for the stirrer 760. The structure includes a linear actuator 1120 vertically driving a plate 1122 to move up and down in a predetermined range. The plate 1122 engages the end 1036 of the stirrer rod 762, so that the end 1036 can also controllably move up and down. As the stirrer rod 762 pivots on the horizontal shaft 1015, and there is an open space 1112 in the vertical shaft 1002 surrounding the horizontal shaft 1015, the linear actuator 1120's vertical movement causes the stirrer 760 to swing vertically in the direction 915. In this embodiment, the linear actuator 1120 rotates along with the shaft 1002, so that the stirrer 760 can simultaneously rotate horizontally in the direction 905 and swing vertically in the direction 915.

In operation, the automated cooker 702 is controlled by the tablet computer 150 and can work in manual, simulated and automated mode.

Figure 12:
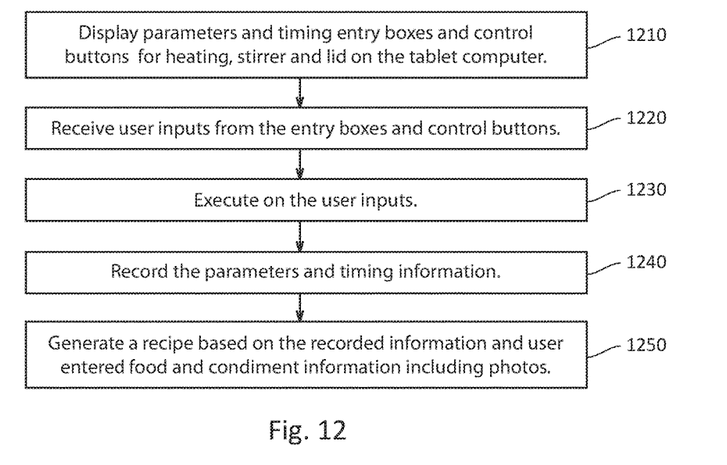
FIG. 12 is a flow-chart illustrating a manual operation of the present automated cooker.

FIG. 12 is a flow-chart illustrating a manual operation of the present automated cooker 100. In the manual mode, the tablet computer 150 displays parameters and timing entry boxes and control buttons for the heating element 520, stirrer 760 and the lid 720 in step 1210. The tablet computer 150 then receives user inputs from the entry boxes and control buttons in step 1220. In response to the user's inputs, the automated cooker 100 executes a desired cooking operation in step 1230. The execution may be immediate or after a specified delay time based on the user's inputs. The tablet computer 150 can record the parameters and timing information in step 1240. If the cooking process is deemed successful, the user can instruct the tablet computer 150 to generate a recipe based on the recorded information and the user further entered information in step 1250. The user further entered information includes information about types and amounts of food, condiment and liquid used as well as text, photo and video instructions. The generated recipe can be later used on the same automated cooker as well as shared with other users over the Internet, so that a successful cooking process can be duplicated as well as enjoyed by many other people.

Figure 13:
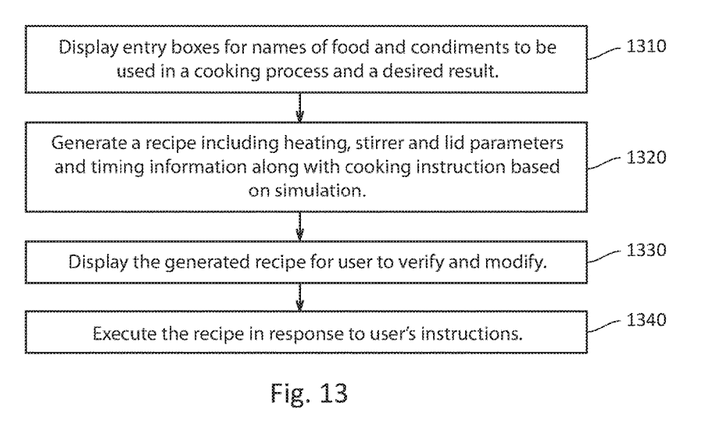
FIG. 13 is a flow-chart illustrating a simulated operation of the present automated cooker.

FIG. 13 is a flow-chart illustrating a simulated operation of the present automated cooker. In the simulated mode, the tablet computer 150 displays entry boxes for names of food and condiments to be used in a cooking process and a desired cooking result in step 1310. The tablet computer 150 then generates a recipe which includes heating, stirrer and lid parameters and various timing information along with cooking instruction based on simulation in step 1320. Simulation models are pre-established on various foods and their combinations in response to heat process, so that when conditions such as volume, temperature or cooking time, change, new result can be predicted based on the simulation models. The tablet computer 150 displays the generated recipe for the user to verify and modify in step 1330. Once verified, the user can then instruct the tablet computer 150 to execute the generated recipe in step 1340.

Figure 14:
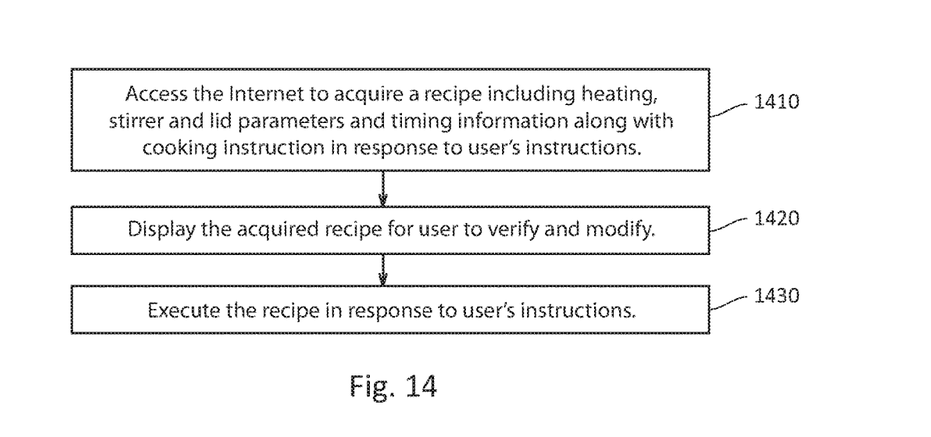
FIG. 14 is a flow-chart illustrating an automated operation of the present automated cooker.

FIG. 14 is a flow-chart illustrating an automated operation of the present automated cooker. The tablet computer 150 has the Internet access. In the automated mode, it can access the Internet to acquire a recipe in response to user's instruction in step 1410. In order to facilitate recipe trading, a market place may be formed over the Internet for recipe developers and buyers to meet. The acquired recipe includes heating, stirrer, and lid parameters and timing information along with cooking instructions. Alternatively, the recipe may already be stored in the tablet computer 150, either locally generated or previously acquired over the Internet. The tablet computer 150 displays the acquired recipe for the user to verify or modify in step 1420. The user can then instruct the tablet computer 150 to execute the recipe in step 1430.

While this disclosure has been particularly shown and described with references to exemplary embodiments thereof, it shall be understood by those skilled in the art that various changes in form and details may be made therein without departing from the spirit of the claimed embodiments.

What is claimed is:

1. A cooking system comprising:
a wok for receiving food, the wok being placed on top of a base unit housing a heating element for heating up the wok;
a lid substantially covering the wok, at least a portion of the lid being able to rotate relative to the wok;
a shaft secured to the rotating portion of the lid;
a stirrer pivotally mounted to the shaft;
a controller housed in the base unit controlling the heating element and rotations of the shaft and the lid, the rotation of the shaft causing a part of the stirrer to sweep from an edge of the wok to approximately a center of the wok in a low path and return to an edge of the wok in a high path, in the low path the part of the stirrer approximately touching a surface of the wok, in the high path the part of the stirrer being high above and not touching the surface of the wok; and
a first computing device residing outside of the base unit and signally coupled to the controller, the first computing device storing a computer program upon execution instructing the first computing device to send operating commands to the controller, the operating commands controlling the heating element and the rotations of the shaft and the lid.

2. The cooking system of claim 1, wherein the heating element is of an inductive type.

3. The cooking system of claim 1 further comprising a bar removably secured to the base unit, the bar has a rotation driver for driving the rotation of at least a portion of the lid.

4. The cooking system of claim 3 further comprising an image sensor mounted on the bar.

5. The cooking system of claim 3 further comprising a handle mounted on a center of the lid, the handle engaging the rotation driver.

6. The cooking system of claim 5 further comprising a motor for driving the shaft to reciprocally rotate, the motor receives power and control signal from the base unit through conduits in the handle and the bar.

7. The cooking system of claim 1 further comprising a track for guiding movement of the stirrer.

8. The cooking system of claim 7, wherein the track is a looped concave path formed on an internal surface of a circular column.

9. The cooking system of claim 1 further comprising a linear actuator driving an end of the stirrer to reciprocally move in a direction substantially parallel to the shaft.

10. The cooking system of claim 9, wherein the shaft's rotation drives a circular movement of the linear actuator.

11. The cooking system of claim 1, wherein the stirrer has a removable and angle adjustable blade.

12. The cooking system of claim 1 further comprising a sensor for measuring temperature inside the wok.

13. The cooking system of claim 1, wherein the first computing device is a tablet computer wirelessly coupled to the controller.

14. The cooking system of claim 1, wherein the first computing device communicates with a second computing device through Wi-Fi.

15. The cooking system of claim 14, wherein the second computing device is capable of controlling the controller through the first computing device.

16. The cooking system of claim 1, wherein the first computing device is connected to the Internet and capable of downloading and uploading variables for the computer program.

17. The cooking system of claim 16 further comprising a market place on the Internet for trading the variables in a form of cooking recipes.

18. The cooking system of claim 1, wherein the first computing device immediately responds to user inputs and sends commands to the controller.

19. The cooking system of claim 1, wherein the first computing device runs a simulation program to generate a unique set of variables for the computer program.

20. The cooking system of claim 19, wherein the generated set of variables is subject to user verification and modification.

\* \* \* \* \*